United States Patent
Cox et al.

[11] Patent Number: 5,674,430
[45] Date of Patent: Oct. 7, 1997

[54] LITHIUM BOROSILICATE PHOSPHORS

[75] Inventors: James R. Cox, Monroeton; Ronald E. Karam, Towanda, both of Pa.

[73] Assignee: Osram Sylvania Inc., Danvers, Mass.

[21] Appl. No.: 720,607

[22] Filed: Oct. 1, 1996

[51] Int. Cl.$^6$ .............. C09K 11/59; C09K 11/63; C09K 11/53

[52] U.S. Cl. .............. 252/301.4 F; 252/301.4 R; 252/301.4 H

[58] Field of Search .............. 252/301.4 F, 301.4 R, 252/301.4 H

[56] References Cited

U.S. PATENT DOCUMENTS 5,531,928   7/1996   Karam et al. .............. 252/301.4 R

*Primary Examiner*—Melissa Bonner
*Attorney, Agent, or Firm*—William H. McNeill

[57] ABSTRACT

A phosphor comprising a host consisting essentially of lithium borosilicate having the general formula $Li_xMg_yB_2Si_6O_zF_w$, where x can be 2 or 6, y can be 6 or 4, z can be 19.75 or 20 and w can be 4 or 4.5, and at least one activator selected from the group consisting of vanadium, europium, manganese, cerium and terbium.

6 Claims, 5 Drawing Sheets

5,674,430

1

LITHIUM BOROSILICATE PHOSPHORS

TECHNICAL FIELD

This invention relates to phosphors and methods of making them. In particular, it relates to inorganic intercalation phosphors made by doping inorganic intercalation compounds with selected activator ions which, when excited by cathode rays or other exciting radiation, are capable of luminescent emission.

BACKGROUND ART

Phosphors are critical components in a number of lamp types, electroluminescent devices, and cathode ray tubes for televisions and computer monitors. Generally, the performance of these devices can be directly linked to the performance of the phosphors which they incorporate. Thus, in order to promote the evolution of these technologies, it is essential that new phosphors routinely be developed which could be used in those applications.

For cathode ray tube applications, it is necessary that phosphors luminesce when excited by cathode rays (CR), which consist of high energy electrons. Phosphors which are excited by cathode rays are defined as being cathodoluminescent. Although it is desirable that cathodoluminescent phosphors emit light over the entire range of the visible spectrum, phosphors that emit red, green and blue light are particularly important for use in the manufacture of luminescent screens for televisions and computer monitors. Other phosphors are excited by different forms of radiation. For example, some phosphors are energized by exposure to ultraviolet radiation, usually in the frequency range of 254 nm. These phosphors are termed photoluminescent and can emit in various spectral ranges and can be used in lamps.

Thus, it would be an advantage in the art to provide novel phosphors which are capable of luminescent emission when excited by cathode rays or other excitation media.

DISCLOSURE OF INVENTION

It is an object of this invention to provide an inorganic intercalation phosphor capable of luminescent emission when excited by cathode rays or ultraviolet radiation.

It is a further object of this invention to provide a method for producing an inorganic intercalation phosphor.

In accordance with one aspect of the invention, there is provided an inorganic intercalation phosphor comprised of a host consisting essentially of lithium magnesium borosilicate and at least one activator selected from the group consisting of vanadium, europium, manganese, cerium and terbium. The phosphors of the invention provide luminescence under either photo-excitation (254 urn) CR excitation or both.

2

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

As used herein the term lithium borosilicate refers to materials having the general formula, $Li_xMg_yB_2Si_6O_zF_w$, where x can be 2 or 6, y can be 6 or 4, z can be 19.75 or 20 and w can be 4 or 4.5.

For a general discussion of intercalation materials as phosphors, see U.S. Pat. No. 5,531,926, assigned to the assignee of this invention and incorporated herein be reference.

Referring now to the invention with greater particularity, the following non-limiting examples are presented.

EXAMPLE I

Figure 1:
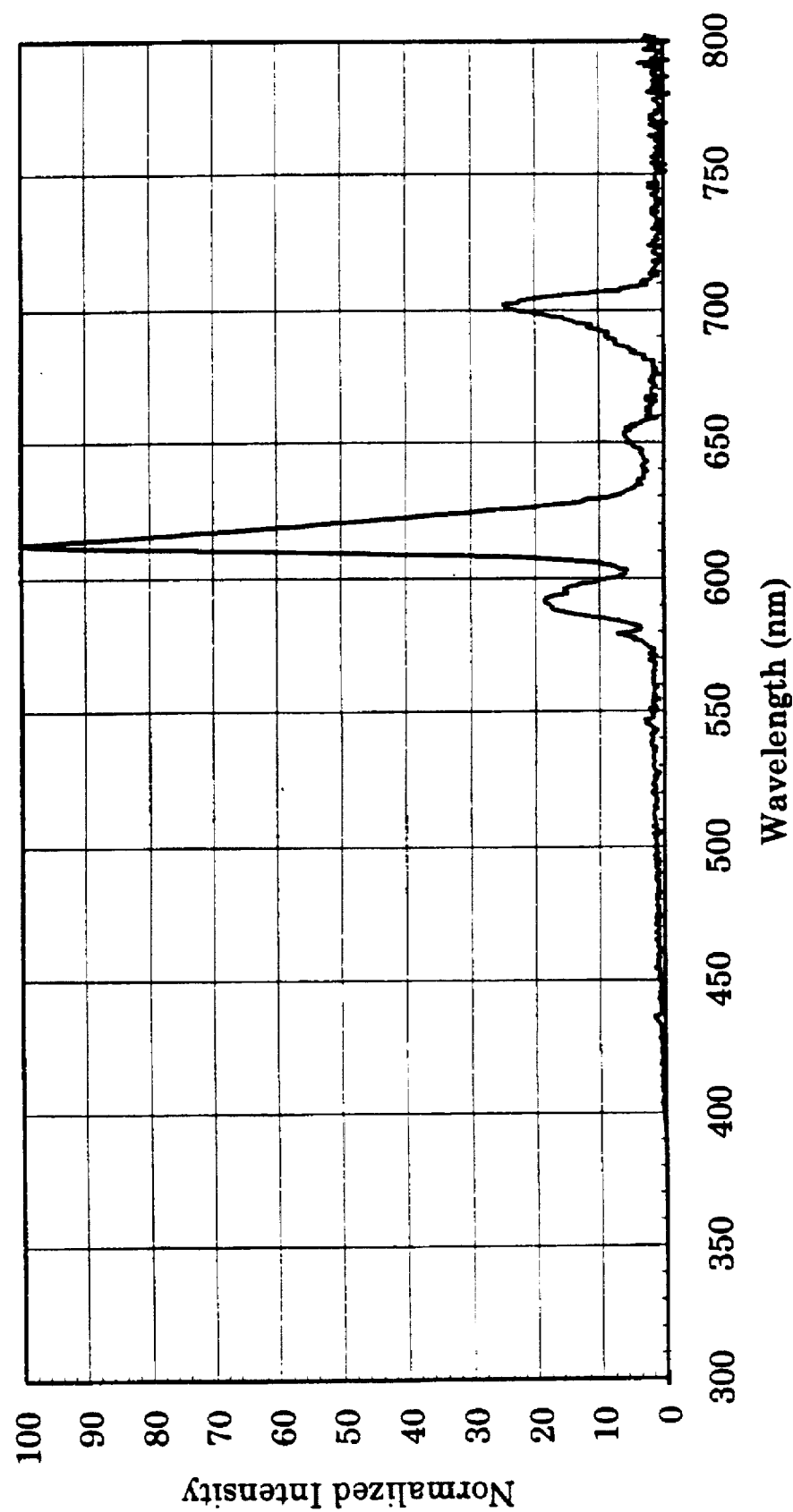
FIG. 1 is a graph of the photoluminescence of an embodiment of the invention.

A lithium borosilicate phosphor, co-activated with vanadium and europium was prepared by blending appropriate quantities of lithium nitrate and/or lithium carbonate ($LiNO_3$, $Li_2CO_3$), magnesium oxide (MgO), boron oxide ($B_2O_3$), ammonium hexafluorosilicate ($(NH_4)_2SiF_6$), silicon dioxide ($SiO_2$), vanadium pentoxide ($V_2O_5$), and europium fluoride ($EuF_3$). As a control, one sample was prepared without the activators. The reagent materials were blended on a mechanical mixer for 20 to 30 minutes, the mixtures were placed into alumina crucibles, covered with a lid, and fired at 800° C. for 12 to 18 hours. The samples were then pulverized and sieved to form the final product. Each sample was analyzed by using X-ray powder diffraction, ensuring that the lithium borosilicate compound was formed. The material including the activators has the general formula $Li_2(Mg_{6-(x+y)}V_xEu_y)B_2Si_6O_{20}F_4$, indicating that the vanadium and europium substitute for the magnesium. The amounts of the starting materials, in grams, are shown in Table I. This phosphor exhibited photoluminescence under 254 nm excitation with a peak at about 615 nm, as shown in FIG. 1. The unactivated control gave little or no emission under either UV or CR excitation.

TABLE I

|  | Example 1 | Example 2 |
| --- | --- | --- |
| $Li_2CO_3$ | 4.95 | 4.93 |
| MgO | 16.21 | 16.04 |
| $B_2O_3$ | 4.67 | 4.65 |
| $(NH_4)_2SiFe$ | 7.96 | 7.93 |
| $SiO_2$ | 21.47 | 21.38 |
| $V_2O_5$ | XXX | 0.121 |
| $EuF_3$ | XXX | 0.279 |
| mol V/mol phosphor | 0.00 | 0.02 |
| mol Eu/mol phosphor | 0.00 | 0.02 |
| [1]UV Brightness (fL) | ~0.0 | 0.97 |

EXAMPLE II

Figure 2:
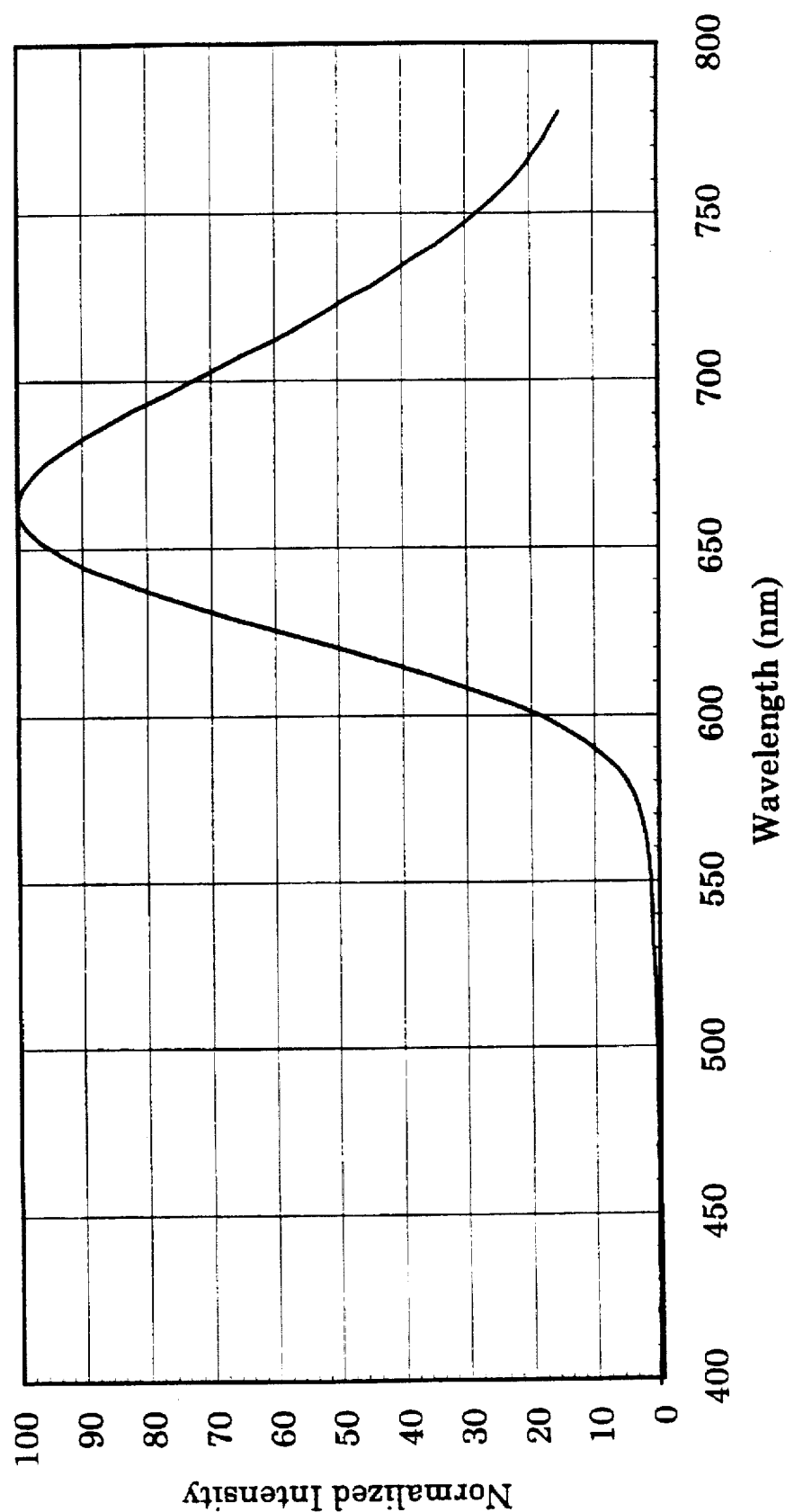
FIG. 2 is a graph of the cathodoluminescence of an embodiment of the invention.
Figure 3:
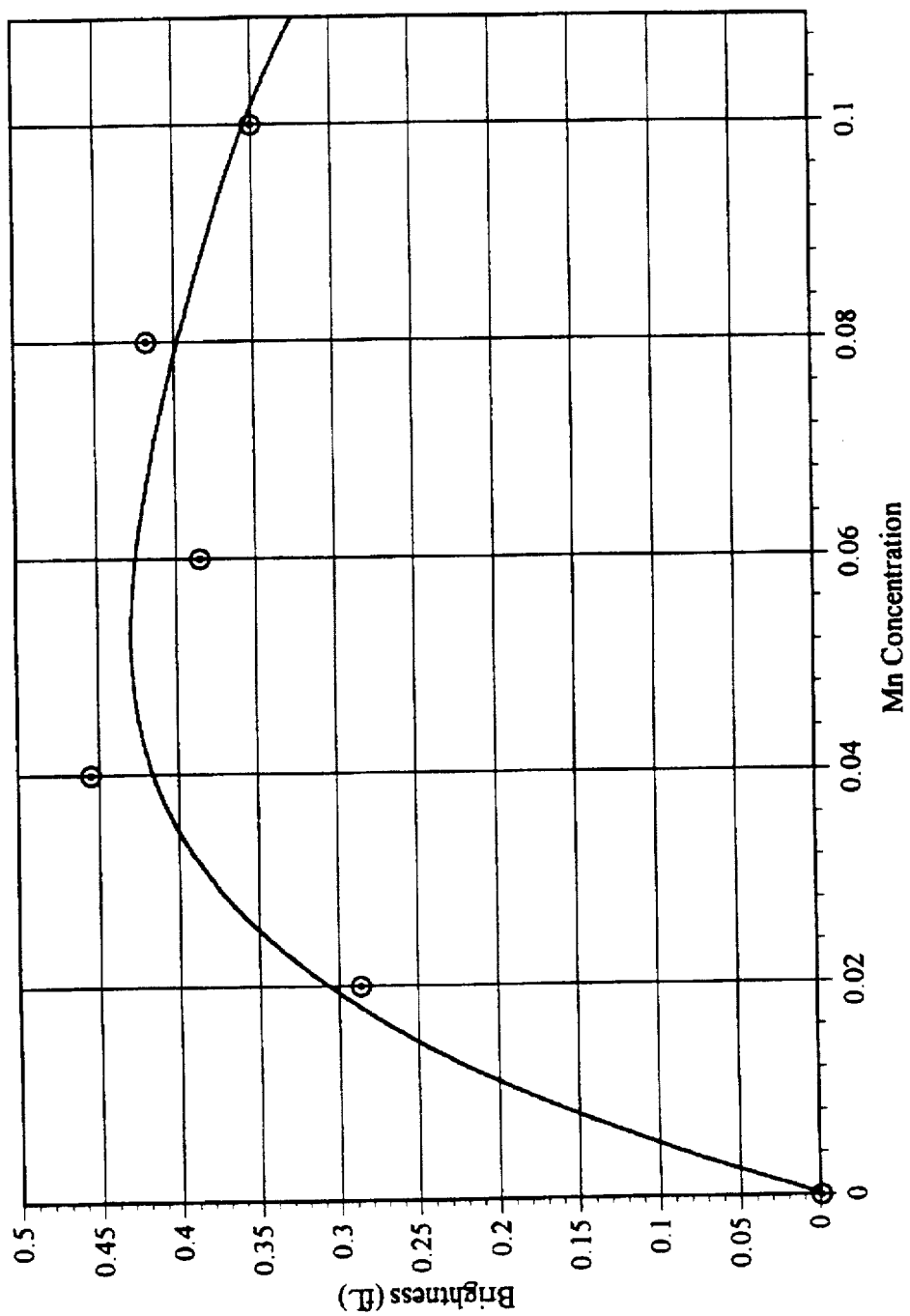
FIG. 3 is a graph of the variation in brightness of the phosphor of FIG. 2, dependent upon the concentration of activator.

A lithium borosilicate phosphor activated by manganese at various levels was prepared as above except that manganese, as manganese carbonate ($MnCO_3$) was used in place of the vanadium and europium. Additionally, the materials, after pulverizing, were subjected to a second firing at 800° C. for about 3 hours in a 5% $H_2$/95% $N_2$ atmosphere to fully convert the manganese to the divalent state. The phosphors had the general formula $Li_2(Mg_{6-x}$ $Mn_x)B_2Si_6O_{20}F_4$. The results, and starting material amounts in grams, are shown in Table II. These phosphors emitted in the red region of the spectrum, as shown in FIG. 2, with a broad band centered near 665 nm. Excitation was performed with a focused electron beam typically at 10 kV, 10 µA or 15 kV, 8 µA. The level of brightness emitted varied with the manganese concentration, as shown in FIG. 3.

TABLE II

|  | Example 1 | Example 2 | Example 3 | Example 4 | Example 5 | Example 6 |
|---|---|---|---|---|---|---|
| $Li_2CO_3$ | 4.95 | 4.94 | 4.94 | 4.94 | 4.94 | 4.93 |
| MgO | 16.21 | 16.15 | 16.15 | 16.01 | 15.95 | 15.88 |
| $B_2O_3$ | 4.67 | 4.66 | 4.66 | 4.65 | 4.65 | 4.65 |
| $(NH_4)_2SiF_6$ | 7.96 | 7.96 | 7.96 | 7.94 | 7.94 | 7.93 |
| $SiO_2$ | 21.47 | 21.45 | 21.45 | 21.41 | 21.40 | 21.38 |
| $MnCO_3$ | XXX | 0.154 | 0.154 | 0.461 | 0.614 | 0.767 |
| mol Mn/mol phosphor | 0.00 | 0.02 | 0.04 | 0.06 | 0.08 | 0.10 |
| [1]CRT Brightness (fL) | ≈0.04 | 0.287 | 0.456 | 0.386 | 0.418 | 0.351 |

EXAMPLE III

Figure 4:
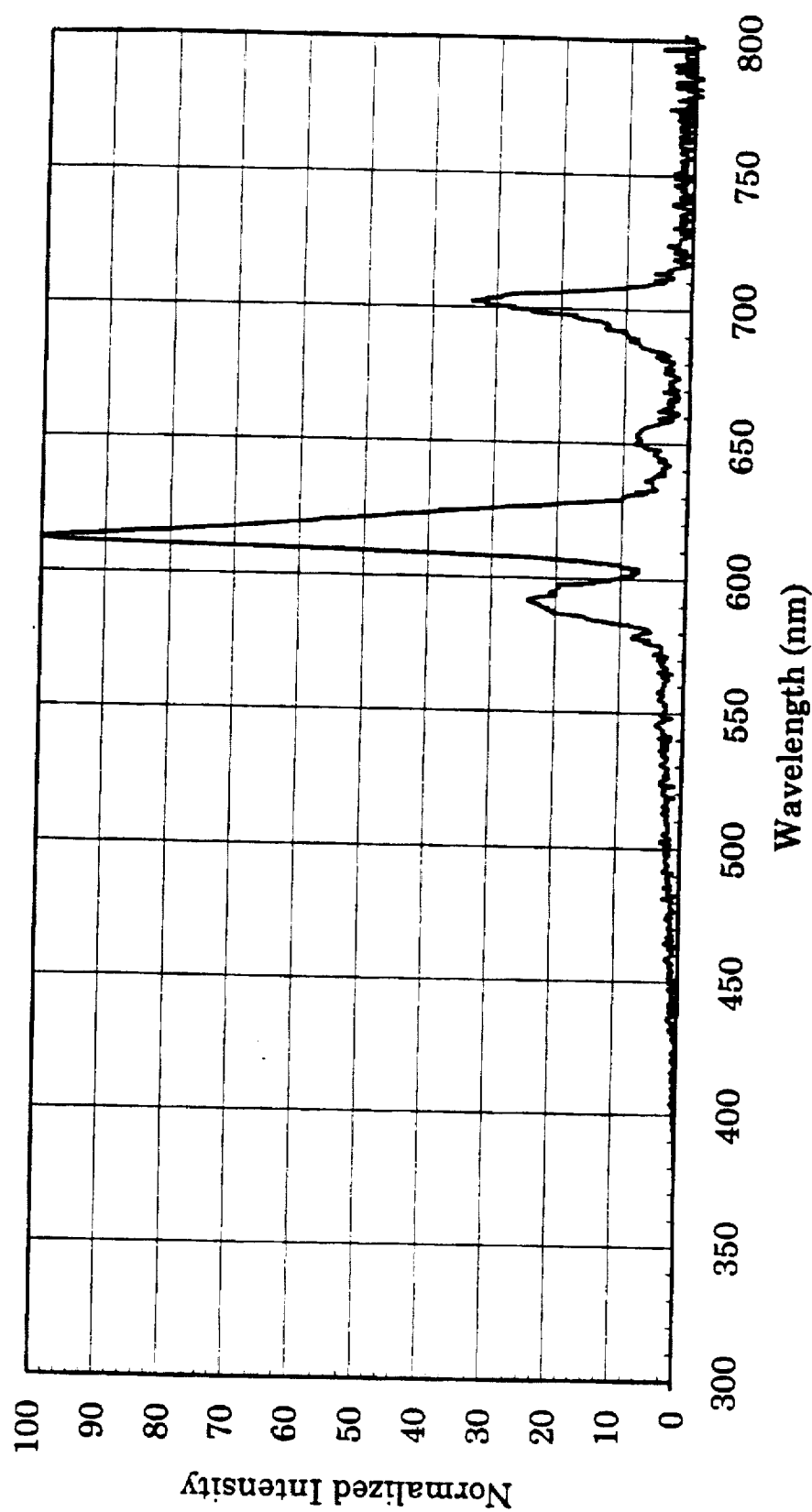
FIG. 4 is a graph of the photoluminescence of yet another embodiment of the invention.

A phosphor having the general formula $Li_4(Mg_{4-(x+y)}V_xEu_y)Li_2B_2Si_6O_{19.75}F_{4.5}$, employing vanadium and europium as co-activators, was synthesized as in Example I except that firing occurred at 850° C. for 17 hours. The amounts of the starting reagents, in grams, is shown in Table III. The phosphor displayed red emission with a sharp peak centered near 618 nm under 254 nm excitation. The emission spectrum is shown in FIG. 4.

TABLE III

|  | Example 1 | Example 2 |
|---|---|---|
| MgO | 11.04 | 10.88 |
| $Li_2CO_3$ | 15.17 | 15.11 |
| $B_2O_3$ | 4.77 | 4.75 |
| $(NH_4)_2SiF_6$ | 9.15 | 9.11 |
| $SiO_2$ | 21.59 | 21.50 |
| $V_2O_5$ | XXX | 0.124 |
| $EuF_3$ | XXX | 0.285 |
| mol V/mol phosphor | 0.00 | 0.02 |
| mol Eu/mol phosphor | 0.00 | 0.02 |
| [1]UV Brightness (fL) | ≈0.0 | 0.73 |

EXAMPLE IV

Figure 5:
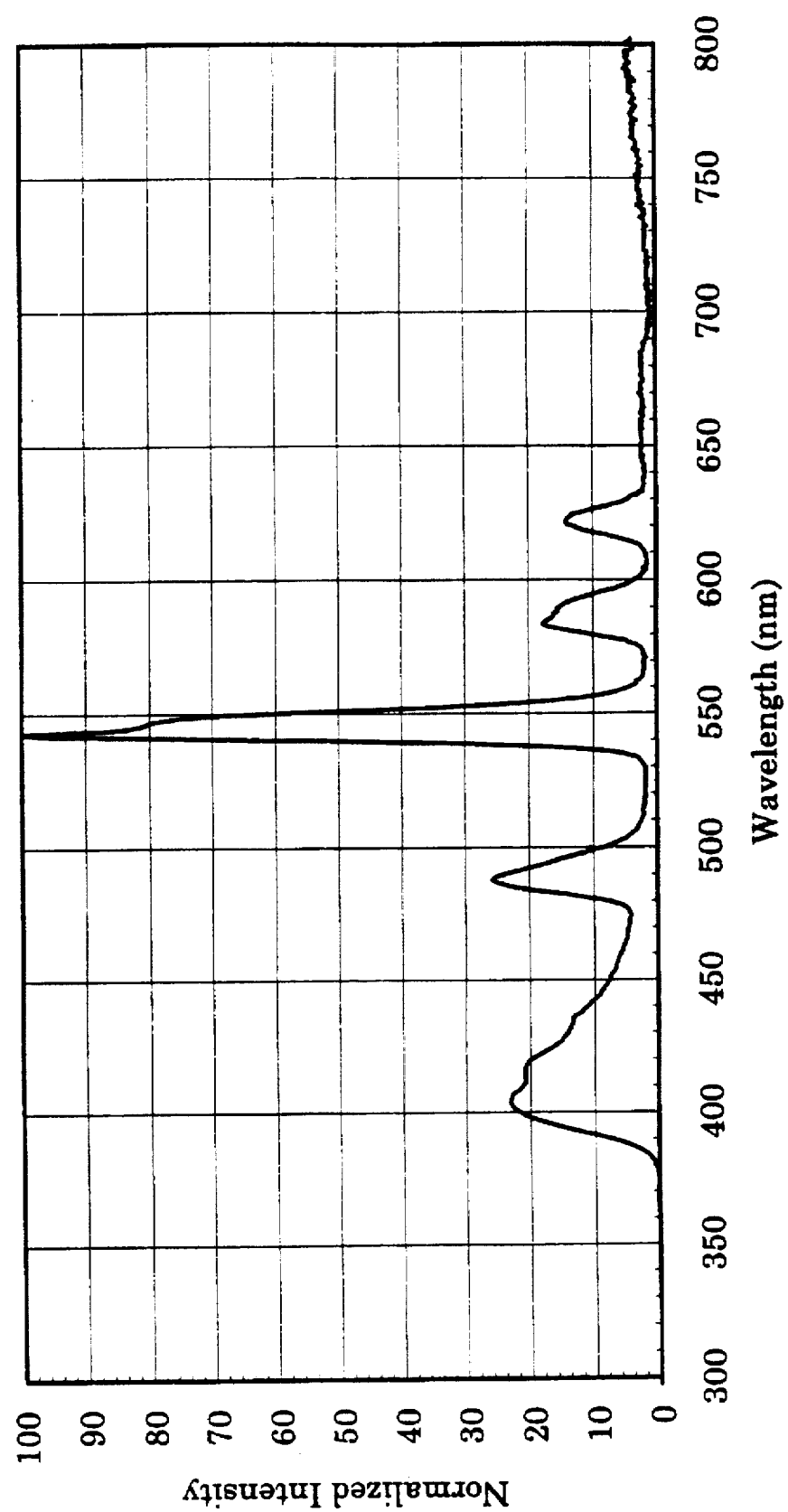
FIG. 5 is a graph of the photoluminescence of still another embodiment of the invention.

A phosphor having the general formula $Li_4(Mg_{4-(x+y)}Ce_xTb_y)Li_2B_2Si_6O_{19.75}F_{4.5}$, was prepared as in Example II except that cerium (as $CeF_3$) and terbium (as $TbF_3$) were substituted for the manganese. The second firing step in this instance is necessary to fully convert the cerium to the trivalent state. The material exhibited both cathodoluminescence and photoluminescence. The emission source for the CR excitation was the same as in Example II. The UV source was 254 nm. The spectra for both sources were substantially identical. The photoluminescence spectrum is shown in FIG. 5. The starting reagents, in grams, are shown in Table IV.

TABLE IV

|  | Example 1 | Example 2 |
|---|---|---|
| MgO | 11.04 | 10.76 |
| $Li_2CO_3$ | 15.17 | 15.02 |
| $B_2O_3$ | 4.77 | 4.72 |
| $(NH_4)_2SiF_6$ | 9.15 | 9.05 |
| $SiO_2$ | 21.59 | 21.38 |
| $CeF_3$ | XXX | 0.534 |
| $TbF_3$ | XXX | 0.354 |
| mol Ce/mol phosphor | 0.00 | 0.04 |
| mol Tb/mol phosphor | 0.00 | 0.02 |
| [1]UV Brightness (fL) | ≈0.0 | 4.84 |
| [2]CRT Brightness (fL) | ≈0.0 | 2.03 |

As with the previous examples, the unactivated materials gave little or no emission under either UV or CR excitation.

While there have been shown and described what are at present considered the preferred embodiments of the invention, it will be apparent to those skilled in the art that various changes and modifications can be made herein without departing from the scope of the invention as defined by the appended claims.

What is claimed is:

1. A phosphor comprising a host consisting essentially of lithium borosilicate and at least one activator selected from the group consisting of vanadium, europium, manganese, cerium and terbium.

2. The phosphor of claim 1 having the general formula $Li_2(Mg_{6-(x+y)}V_x, Eu_y)B_2Si_6O_{20}F_4$ and wherein x is about 0.02 and y is about 0.02.

3. The phosphor of claim 1 having the general formula $Li_2(Mg_{6-x}Mn_x)B_2Si_6O_{20}F_4$ and wherein x is from about 0.02 to about 0.10.

4. The phosphor of claim 3 wherein x is about 0.04.

5. The phosphor of claim 1 having the general formula $Li_4(Mg_{4-(x+y)}V_xEu_y)Li_2B_2Si_6O_{19.75}F_{4.5}$ and wherein x is about 0.02 and y is about 0.02.

6. The phosphor of claim 1 having the general formula $Li_4(Mg_{4-(x+y)}Ce_xTb_y)Li_2B_2Si_6O_{19.75}F_{4.5}$ and wherein x is about 0.04 and y is about 0.02.

\* \* \* \* \*